(12) United States Patent
Adams

(10) Patent No.: US 11,877,097 B1
(45) Date of Patent: Jan. 16, 2024

(54) MODULAR WIRELESS TRANSMITTERS FOR PREMISES MONITORING SYSTEMS

(71) Applicant: The ADT Security Corporation, Boca Raton, FL (US)

(72) Inventor: Benjamin Adams, Bristol, FL (US)

(73) Assignee: The ADT Security Corporation, Boca Raton, FL (US)

(*) Notice: Subject to any disclaimer, the term of this patent is extended or adjusted under 35 U.S.C. 154(b) by 0 days.

(21) Appl. No.: 18/335,552

(22) Filed: Jun. 15, 2023

(51) Int. Cl.
*H04N 7/18* (2006.01)
*H04N 7/10* (2006.01)
*H04N 23/57* (2023.01)

(52) U.S. Cl.
CPC .............. *H04N 7/185* (2013.01); *H04N 7/102* (2013.01); *H04N 23/57* (2023.01)

(58) Field of Classification Search
CPC ......... H04N 7/185; H04N 23/57; H04N 7/102
USPC .......................................................... 348/143
See application file for complete search history.

(56) References Cited

U.S. PATENT DOCUMENTS

| 7,904,611 | B2* | 3/2011 | Takezaki | H04W 52/0229 |
| | | | | 713/323 |
| 9,025,609 | B2* | 5/2015 | Pugliese, IV | H04L 12/40045 |
| | | | | 709/200 |
| 9,144,143 | B2 | 9/2015 | Raji et al. | |
| 2005/0267605 | A1* | 12/2005 | Lee | G08B 25/14 |
| | | | | 700/19 |
| 2006/0209850 | A1* | 9/2006 | Zhang | H04M 11/06 |
| | | | | 370/328 |
| 2007/0070206 | A1* | 3/2007 | Clark | H04N 23/71 |
| | | | | 348/E5.025 |
| 2011/0221907 | A1* | 9/2011 | Smart | H04N 21/4363 |
| | | | | 348/158 |
| 2012/0062026 | A1* | 3/2012 | Raji | H04L 12/10 |
| | | | | 307/31 |
| 2013/0217338 | A1* | 8/2013 | Chou | G06F 3/02 |
| | | | | 455/41.2 |
| 2015/0313570 | A1* | 11/2015 | Han | A61B 6/46 |
| | | | | 200/341 |
| 2017/0033734 | A1* | 2/2017 | Uebel | G01R 21/06 |
| 2017/0372573 | A1* | 12/2017 | Park | G08B 25/10 |
| 2023/0266769 | A1* | 8/2023 | Huang | G05D 1/0265 |
| | | | | 318/587 |

* cited by examiner

Primary Examiner — Matthew David Kim
(74) Attorney, Agent, or Firm — Christopher & Weisberg, P.A.

(57) ABSTRACT

An apparatus and method are described. In at least one embodiment, a premises monitoring system for monitoring a premises is provided. The premises monitoring system comprises a premises device and a power device comprising a rectifier in electrical communication with the premises device. The premises device comprises a video capture element configured to capture video and processing circuitry configured to, in response to a modular wireless transmitter not being removably connected to the premises device, cause transmission of the captured video to the power device via the at least one wired connection. When the modular wireless transmitter is removably connected to the power device, the power device is configured to cause, in response to receiving the captured video, transmission of the captured video via the modular wireless transmitter.

16 Claims, 4 Drawing Sheets

MODULAR WIRELESS TRANSMITTERS FOR PREMISES MONITORING SYSTEMS

TECHNICAL FIELD

The present disclosure is generally related to premises security and to methods and systems for a modular wireless transmitter for a premises monitoring system.

BACKGROUND

Premises monitoring systems may include multiple devices of various types, including sensors, detectors, video cameras, etc., that are used for monitoring a premises. The data generated by these various types of devices may be communicated to a system control device to initiate an event alarm based on the data.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve the electrical and data communication.

In some embodiments described herein, the term "coupled," "connected," and the like, may be used herein to indicate a connection, although not necessarily directly, and may include wired and/or wireless connections.

Figure 1:
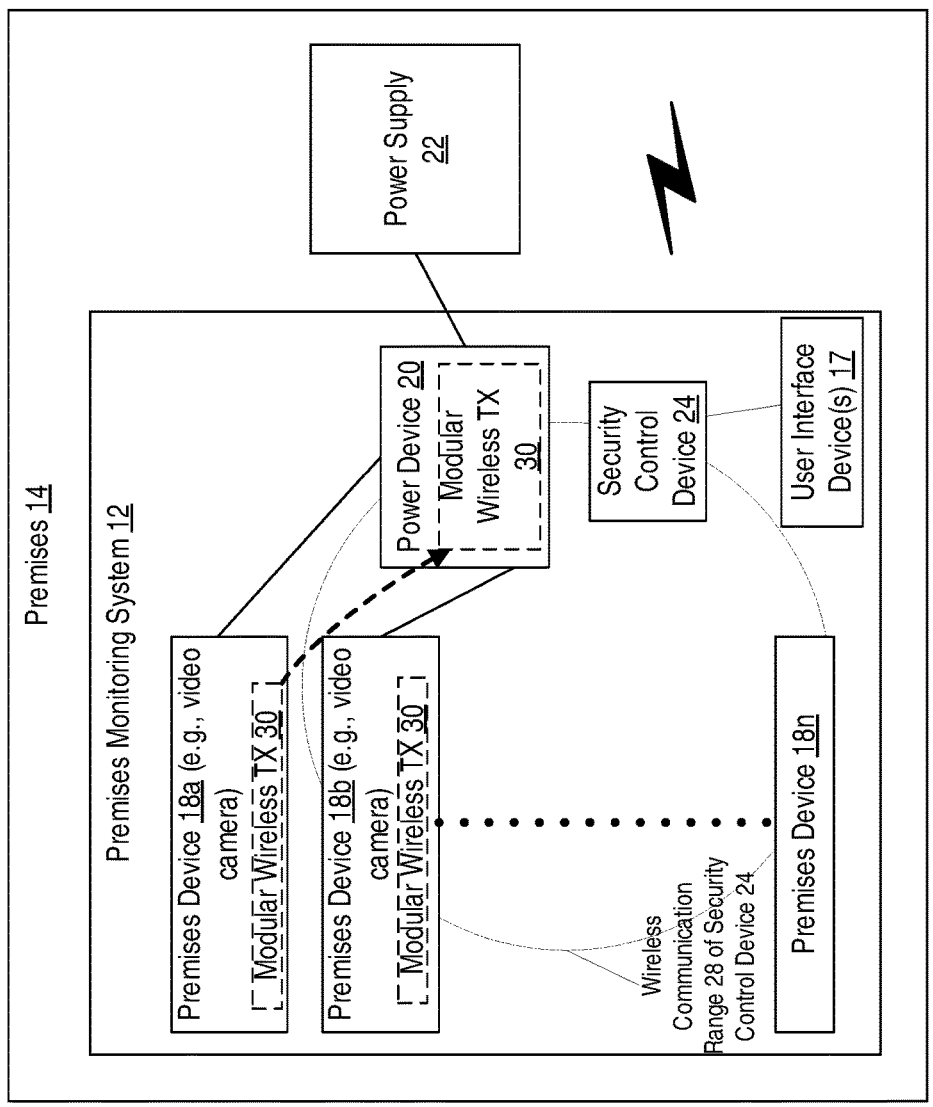
FIG. 1 is a diagram of an example system comprising a premises monitoring system according to some embodiments of the present disclosure.

Referring now to the drawing figures in which like reference designators refer to like elements there is shown in FIG. 1 a system designated generally as "10." System 10 may include premises monitoring system 12 for monitoring premises 14. According to various embodiments, the premises monitoring system 12 may be, for example, a burglary alarm system, an alarm system for monitoring the safety of life and/or property, a home automation system, and/or other types of premises monitoring systems 12. Premises monitoring system 12 includes and/or is associated with one or more user interface devices 17, one or more premises devices 18a to 18n (collectively referred to as "premises device 18"), a power device 20, power supply 22, and system control device 24. System control device 24 may be configured for controlling and/or managing the premises monitoring system 12. System control device 24 may be in communication with remote monitoring environment 31 via one or more networks 26. According to various embodiments, the premises monitoring system 12 may be, for example, a premises security system and/or a premises automation system.

User interface device 17 may be a wireless device that allows a user to communicate with system control device 24. User interface device 17 may be a portable control keypad/interface, computer, mobile phone or tablet, among other devices that allow a user to interface with system control device 24 and/or one or more premises devices 18. User interface device 17 may communicate at least with system control device 24 using one or more wired and/or wireless communication protocols. For example, portable control keypad may communicate with system control device 24 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols. In one or more embodiments, user interface device 17 and system control device 24 may be integrated into a single device.

Premises device 18 may include sensors, device management apparatuses, image capture devices, audio capture devices, life safety devices, premises automation devices, and/or other devices. For example, the types of sensors may include various life safety-related sensors, such as motion sensors, fire sensors, carbon monoxide sensors, flooding sensors and contact sensors, among other sensor types. A device management apparatus may include, for example, a device configured to adjust at least one premises setting, such as lighting, temperature, energy usage, door lock and power settings, among other settings associated with the premises or devices on the premises. Image capture devices may include digital cameras and/or video cameras, among other image capture devices. Premises device 18 may be configured for sensing one or more aspects of the environment, such as an open or closed door, open or closed window, motion, heat, smoke, gas, sounds, images, people, animals, objects, etc.

In one or more embodiments, premises device 18 may comprise a removably connectable, removably receivable and/or removably insertable modular wireless transmitter 30 that is configured to communicate data (e.g., captured media (video and/or audio)) to, for example, system control device 24. In one or more embodiments, modular wireless transmitter 30 is a removably pluggable module that is configured to mate with a connector at premises device 18 and/or power device 20. For example, modular wireless transmitter 30 comprises a male universal serial bus (USB) that is removably pluggable into a female USB port (e.g., type of receptacle) at premises device 18 and/or power device 20, although other types of removable pluggable mechanisms may be used to electrically connect modular wireless transmitter 30.

Power device 20 is configured to power one or more premises devices 18 via one or more wired connections. For example, power device 20 may comprise a rectifier that converts alternating current (AC) power from power supply 22 to DC power for powering one or more premises devices 18. In one or more embodiments, the rectifier may include an optional DC-to-DC converter to generate a regulated power supply for powering one or more elements in system 10. In one or more embodiments, the rectifier may comprise an AC-to-DC transformer. In one or more embodiments, power supply 22 may be any power-supplying circuit and/or device that provides power to power device 20. Further, in one or more embodiments, power device 20 may comprise a removably connectable, removably receivable and/or removably insertable modular wireless transmitter 30 that is configured to communicate data (e.g., captured media) to, for example, system control device 24, as described herein.

For example, modular wireless transmitter 30 may be removably insertable in either one of premises device 18 or power device 20 depending on the wireless communication range of system control device 24 with respect to the location of premises device 18 at premises 14. In the example in FIG. 1, modular wireless transmitter 30 may be removed from premises device 18 that is out of wireless communication range of system control device 24, and removably inserted into power device 20 that is in wireless communication range of system control device 24. In this example, power device 20 may receive the captured video from premises device 18a and then wirelessly transmit the captured video to system control device 24 using the modular wireless transmitter 30, as described herein.

System control device 24 may provide one or more of management functions, monitoring functions, analysis functions, control functions such as power management, premises device management and alarm management and/or analysis, among other functions to premises monitoring system 12. In particular, system control device 24 may manage one or more life safety or premises automation features. Life safety features may correspond to monitoring system functions and settings associated with premises conditions that may result in life-threatening harm to a person, such as carbon monoxide detection and intrusion detection (e.g., video detection, sensor detection, etc.). Premises automation features may correspond to monitoring system functions and settings associated with video capturing devices and non-life-threatening conditions of the premises, such as lighting and thermostat functions. In one or more embodiments, system control device 24 may receive capture media from one or more premises devices via a wireless modular transmitter 30 that is removably inserted in premises device 18 or power device 20, as described herein.

System control device 24 may communicate with network 26 via one or more communication links. In particular, the communications links may be broadband communication links, such as a wired cable modem or Ethernet communication link, and a digital cellular communication link, such as a long term evolution (LTE), 5G and/or 6G based link, among other broadband communication links. A broadband link in various embodiments may be a communication link other than a plain old telephone service (POTS) line. An Ethernet communication link may be an IEEE 802.3 or 802.11 based communication link. Network 26 may be a wide area network, local area network, wireless local network and metropolitan area network, among other networks. In one or more embodiments, system control device 24 may have a wireless communication range 28 for communicating with one or more devices within the wireless communication range 28. Network 26 provides communications among one or more of system control device 24, and/or remote monitoring environment 31.

System 10 may also include a remote monitoring environment 31 in communication with premises monitoring system 12 via network 26. Remote monitoring environment 31 may be configured to perform certain monitoring, configuration and/or control functions associated with system 10. For example, remote monitoring environment 31 may receive an alarm event notification from the system control device 24 where the alarm event is generated by the system control device 24 based on the media received via the modular wireless transmitter 30. In one or more embodiments, remote monitoring environment 31 may perform various life safety response processes in notifying the owner of the premises, determining whether an actual alarm event is occurring at the premises, and notifying any appropriate response agency (e.g., police, fire, emergency response, other interested parties such as premises owners, etc.).

Example implementations, in accordance with embodiments of system 10 discussed in the preceding paragraphs will now be described with reference to FIG. 2. Premises device 18 comprises hardware 32. The hardware 32 may include processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores, field programmable gate arrays (FPGAs), and/or application specific integrated circuits (ASICs) adapted to execute instructions. The processor 36 may be configured to access (e.g., write to and/or read from) the memory 38, which may comprise any kind of volatile and/or nonvolatile memory, e.g., cache, buffer memory, random access memory (RAM), read-only memory (ROM), optical memory, and/or erasable programmable read-only memory (EPROM). Further, memory 38 may be configured as a storage device.

Hardware 32 of premises device 18 may include media capture element 40 (e.g., video capture element, such as a camera configured to capture video). In one or more embodiments, media capture element 40 is configured to capture video (e.g., premises device 18 may be a video camera). Hardware 32 may include communication interface 42 enabling premises device 18 to communicate with any component or device of system 10. For example, communication interface 42 may be configured for establishing and maintaining at least a wireless or wired connection with any component or device of system 10, such as with system control device 24 and/or power device 20. The communication interface 42 may be formed as or may include, for example, one or more radio frequency (RF) transmitters, one or more RF receivers, and/or one or more RF transceivers. For example, in one or more embodiments, communication interface 42 may include a removably connectable, removably receivable and/or removably insertable modular wireless transmitter 30 that is configured perform wireless transmission for the premises device 18 when removably received by the premises device 18. In the example of FIG.

2, the modular wireless transmitter 30 is removably connected to the premises device 18 such that premises device 18 causes captured media to be wirelessly transmitted via the modular wireless transmitter 30 such as to, for example, system control device 24. Communication interface 42 and/or premises device 18 may include a receptacle 44 for receiving the modular wireless transmitter 30. In one or more embodiments, receptacle 44 is configured to, in response to the modular wireless transmitter 30 being removably received by receptacle 44, transfer power to the modular wireless transmitter 30 and transfer data to the modular wireless transmitter 30 for wireless transmission.

Premises device 18 further has software 46 (which may include one or more software applications) stored internally in, for example, memory 38, or stored in external memory (e.g., database, storage array, network storage device, etc.) accessible by the premises device 18 via an external connection. Software 46 may include any software or program configured to perform the steps or processes of the present disclosure, e.g., causing wireless or wired transmission of video captured by media capture element 40.

The processing circuitry 34 may be configured to control any of methods and/or processes described herein and/or to cause such methods, and/or processes to be performed, e.g., by premises device 18. Processor 36 corresponds to one or more processors 36 for performing premises device 18 functions described herein. The memory 38 is configured to store data and/or files such as premises system data and/or other information/data. In some embodiments, the software 46 may include instructions that, when executed by the processor 36 and/or processing circuitry 34, causes the processor 36 and/or processing circuitry 34 to perform the processes described herein with respect to premises device 18. For example, processing circuitry 34 of premises device 18 may include media unit 48, which may be configured to perform any of the processes, steps, or functions described herein, e.g., cause wired or wireless transmission of captured media.

Figure 2:
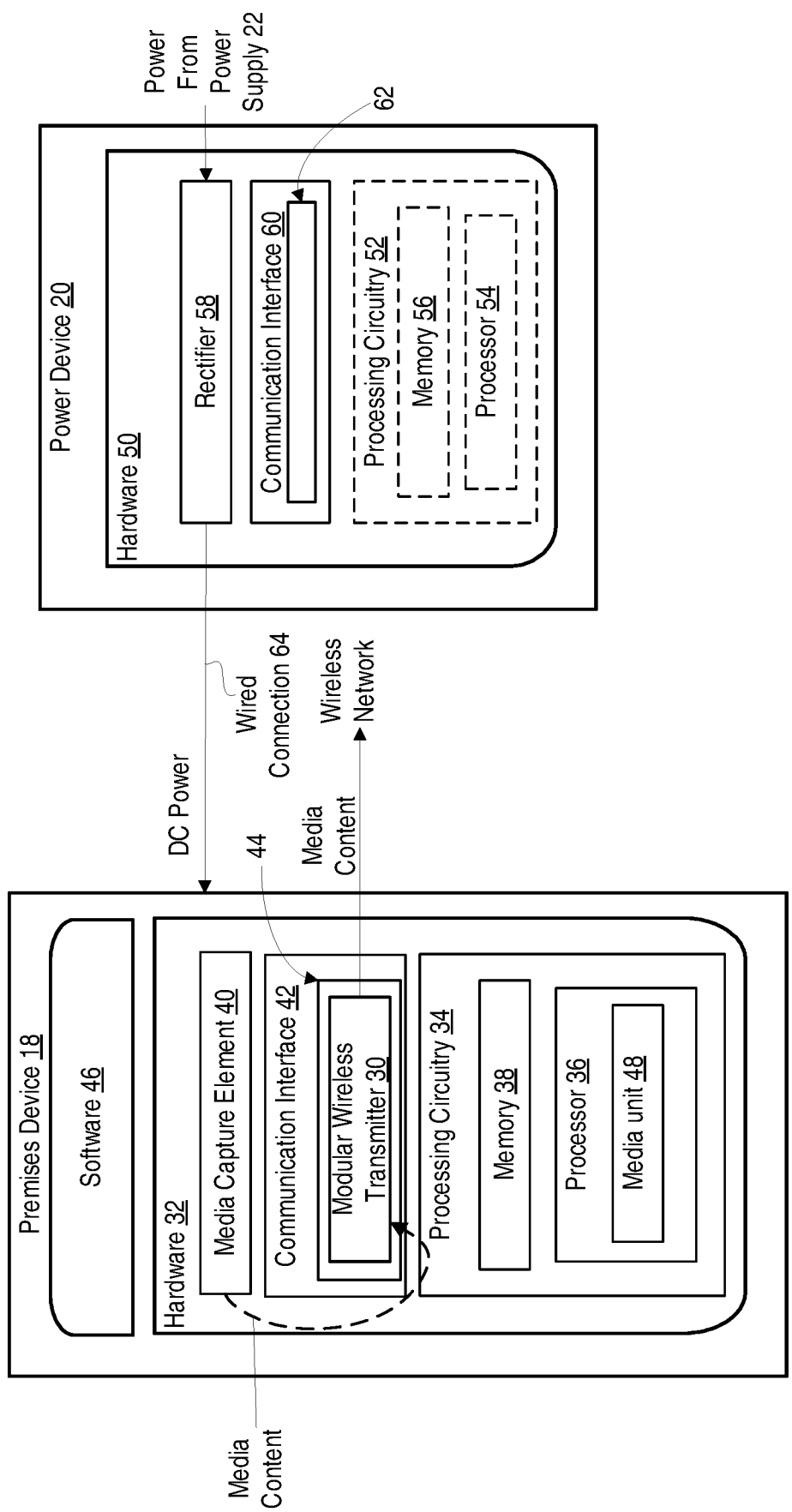
FIG. 2 is a block diagram of an example of a premises device and power device in the system of FIG. 1 according to some embodiments of the present disclosure.

Continuing to refer to FIG. 2, power device 20 comprises hardware 50. The hardware 50 may include processing circuitry 52. The processing circuitry 52 may include a processor 54 and a memory 56. In particular, in addition to or instead of a processor, such as a central processing unit, and memory, the processing circuitry 52 may comprise integrated circuitry for processing and/or control, e.g., one or more processors and/or processor cores, FPGAs, and/or ASICs adapted to execute instructions. The processor 54 may be configured to access (e.g., write to and/or read from) the memory 56, which may comprise any kind of volatile and/or nonvolatile memory, e.g., cache, buffer memory, RAM, ROM, optical memory, and/or EPROM. Further, memory 56 may be configured as a storage device.

Hardware 50 of power device 20 may include rectifier 58. The rectifier 58 may be configured to convert AC power from power supply 22 to DC power that may be used to, for example, power one or more premises devices 18. In one or more embodiments, the rectifier 58 may comprise an optional DC-to-DC converter to generate a regulated power supply for powering one or more elements in system 10. In one or more embodiments, rectifier 58 may comprise one or more electrical elements and/or circuits that are configured to convert AC power from power supply 22 to DC power. Hardware 32 may include communication interface 60 enabling power device 20 to communicate with one or more components or devices of system 10. Communication interface 60 may include receptacle 62 that is configured to, in response to the modular wireless transmitter 30 being removably received by receptacle 62, transfer power to the modular wireless transmitter 30 and transfer data to the modular wireless transmitter 30 for wireless transmission. However, in the example of FIG. 2, modular wireless transmitter 30 is removably received by receptacle 44 such that communication interface 60 does not include modular wireless transmitter 30.

In one or more embodiments, power device 20 may include software (not shown), which may include one or more software applications, stored internally in, for example, memory 56, or stored in external memory (e.g., database, storage array, network storage device, etc.) accessible by the power device 20 via an external connection. Software may include any software or program configured to perform the steps or processes of the present disclosure, e.g., causing wireless or wired transmission of video captured by media capture element 40 such as when modular wireless transmitter 30 is removably received by receptacle 62.

The processing circuitry 52 may be configured to control any of methods and/or processes described herein and/or to cause such methods, and/or processes to be performed, e.g., by power device 20. Processor 54 corresponds to one or more processors 54 for performing power device 20 functions described herein. The memory 56 may be configured to store data and/or files such as premises system data and/or other information/data. In some embodiments, the software may include instructions that, when executed by the processor 54 and/or processing circuitry 52, causes the processor 54 and/or processing circuitry 52 to perform the processes described herein with respect to power device 20. In one or more embodiments, processing circuitry 52, processor 54 and memory 56 may be omitted from power device 20 or may be included communication interface 60.

In the example of FIG. 2, power device 20 provides DC power to premises device 18 via a wired connection 64 (e.g., ethernet cable such as a Category (CAT) 5 cable, CAT 6 cable, etc.). Further, modular wireless transmitter 30 is removably received by receptacle 44 such that media captured by media capture element 40 is wirelessly transmitted via a wireless network. Hence, in this example, premises device 18 may be within the communication range of system control device 24 such that modular wireless transmitter 30 is not: removed from premises device 18 and removably inserted into receptacle 62 of power device 20 which is also within the communication range of system control device 24.

Figure 3:
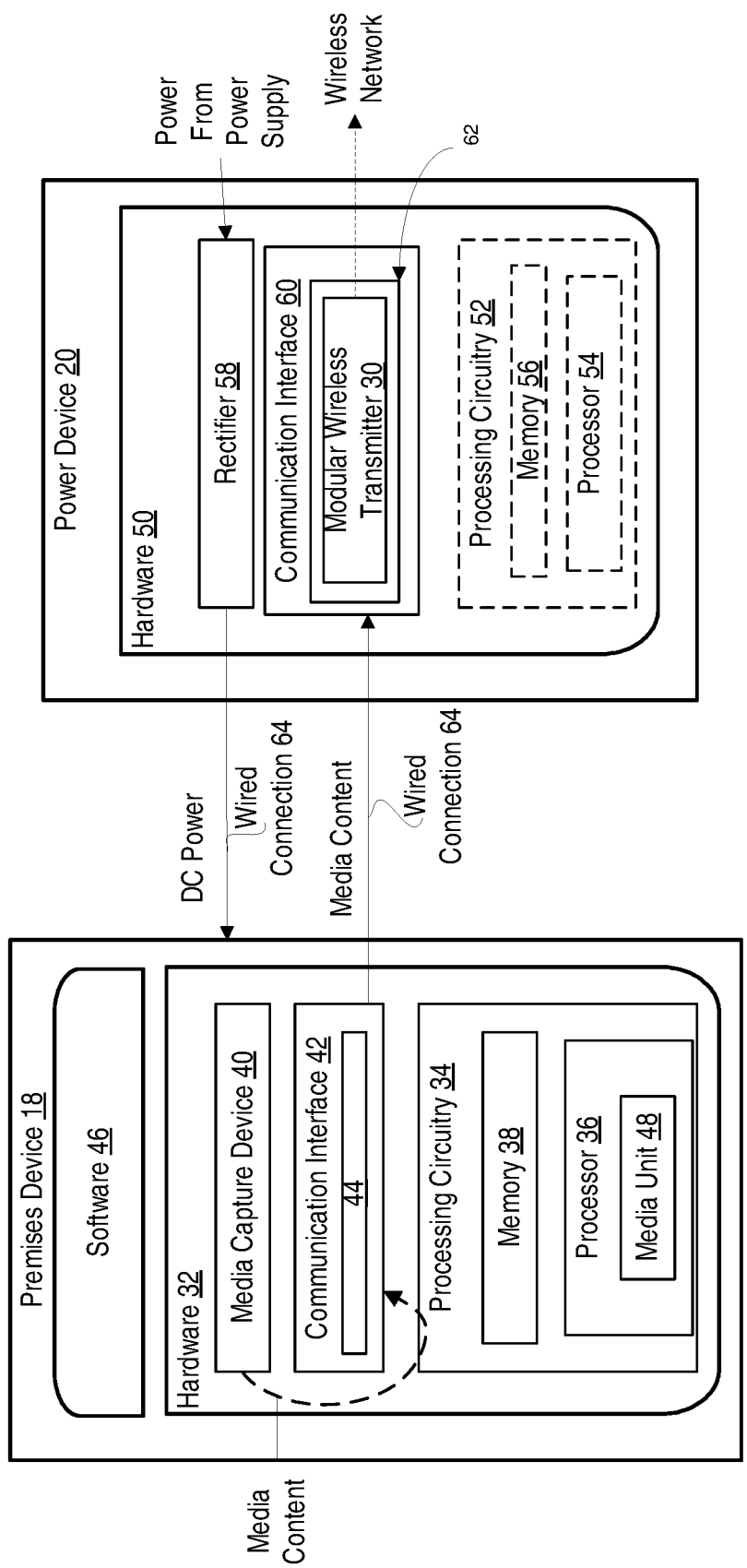
FIG. 3 is a block diagram of another example of a premises device and power device in the system of FIG. 1 according to some embodiments of the present disclosure.

FIG. 3 is a block diagram of another example of premises device 18 and power device 20 of system 10 according to some embodiments of the present disclosure. In the example of FIG. 3, modular wireless transmitter 30 is removably received by receptacle 62 where a wired connection 64 is configured to transfer media content captured by media capture element 40 to communication interface 60 for wireless transmission via modular wireless transmitter 30. In one or more embodiments, wired connection 64 may be an ethernet cable that supports both power and data transfer such that modular wireless transmitter 30 may be removably received by premises device 18 or power device 20 without having to modify wired connection 64. In one example, premises device 18 may be configured with a High-Definition Multimedia Interface (HDMI) to ethernet cable (e.g., CAT 5) converter that plugs into an HDMI port of premise device 18 for transferring captured media content from premise device 18 to wired connection 64. In one or more embodiments, whether a video port (e.g., HDMI port) of premises device 18 is in use may be used by premises device 18 to determine whether to transmit captured media via a wireless connection or wired connection. In one or more embodiments, power device 20 may include a flap or latch that can open by, for example, pushing a button or removing a screw to expose receptacle 62.

Referring to FIGS. 2 and 3, having modular wireless transmitter 30 being removably connectable and/or removably receivable to one of receptacle 44 or receptacle 62 advantageously allows changes to the wireless transmission point for wirelessly transmitting captured media content. Such may be desired, for example, when premises device 18 is out of wireless communication range of system control device 24 but power device 20 is within wireless communication range of system control device 24. This scenario may occur in premises 14 where premises device 18 (e.g., video camera) is placed at the exterior of premises 14 where the wireless communication signal may not reach system control device 24 or may be too severely degraded (e.g., due to distance, line of sight obstructions, etc.) to consistently provide wireless media transfer. However, power device 20 is often located within premises 14 where power device 20 is able to consistently provide wireless media transfer as power device 20 is within communication range of system control device 24.

Figure 4:
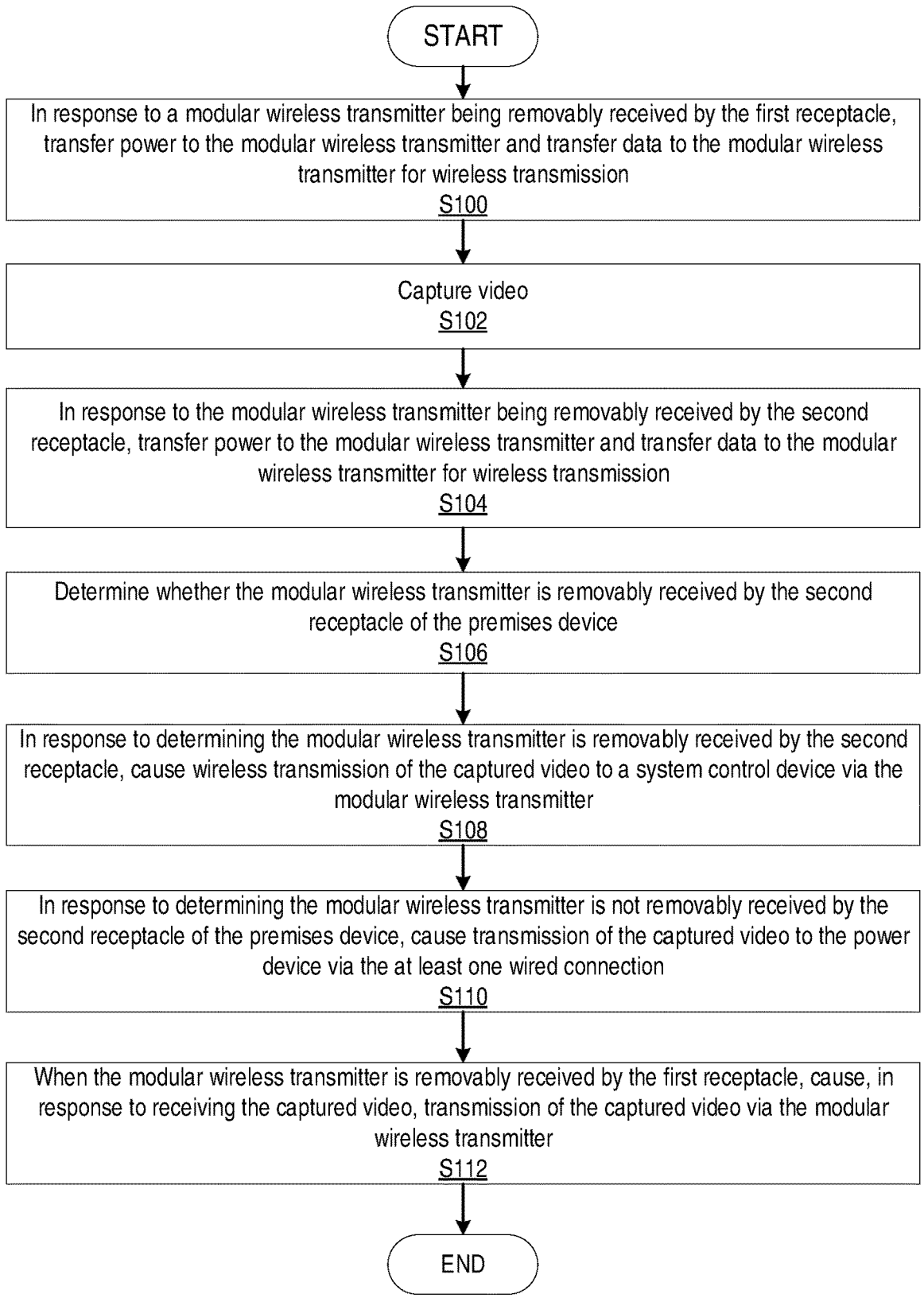
FIG. 4 is a flowchart of an example process in performed in the premises monitoring system of FIG. 1 according to some embodiments of the present disclosure.

FIG. 4 is a flowchart of an example process of system 10 according to some embodiments of the present disclosure. One or more blocks described herein may be performed by one or more elements of premises device 18, such as by one or more of processing circuitry 34 (including the media unit 48) and/or processor 36 and/or communication interface 42 and/or modular wireless transmitter 30. One or more blocks described herein may be performed by one or more elements of power device 20, such as by one or more of processing circuitry 52 and/or processor 54 and/or communication interface 60 and/or modular wireless transmitter 30. In one or more embodiments, rectifier 58 is in electrical communication with premises device 18 and configured to transfer at least electrical power to premises device 18 via at least one wired connection 64.

Power device 20 is configured to, in response to modular wireless transmitter 30 being removably received by the first receptacle 62, transfer power to modular wireless transmitter 30 and transfer data to modular wireless transmitter 30 for wireless transmission (Block S100). Capture video via a video capture element (e.g., media capture element 40) (Block S102). Power device 20 is configured to, in response to modular wireless transmitter 30 being removably received by the second receptacle 44, transfer power to modular wireless transmitter 30 and transfer data to modular wireless transmitter 30 for wireless transmission (Block S104). Premises device 18 is configured to determine whether the modular wireless transmitter 30 is removably received by the second receptacle 44 of the premises device 18 (Block S106).

Premises device 18 is configured to, in response to determining the modular wireless transmitter 30 is removably received by the second receptacle 44 of premises device 18, cause wireless transmission of the captured video to a system control device 24 via the modular wireless transmitter 30 (Block S108). Power device 20 is configured to, in response to determining the modular wireless transmitter 30 is not removably received by the second receptacle 44 of the premises device 18, cause transmission of the captured video to the power device 20 via the at least one wired connection 64 (Block S110). When the modular wireless transmitter 30 is removably received by the first receptacle 62, the power device 20 is configured to cause, in response to receiving the captured video, transmission of the captured video via the modular wireless transmitter 30 (Block S112).

According to one or more embodiments, the premises monitoring system 12 includes system control device 24 having a wireless communication range that reaches the power device 20 and does not reach the premises device 18, where the system control device 24 is configured to receive the captured video from the modular wireless transmitter 30 and initiate at least one action based on the captured video.

According to one or more embodiments, the at least one wired connection 64 comprises at least one power cable that is configured to transfer the at least electrical power to the premises device 18, and at least one data cable that is configured to transfer data.

According to one or more embodiments, the at least one wired connection 64 comprises an Ethernet cable.

According to one or more embodiments, the modular wireless transmitter 30 is one of removably attachable to the power device 20, or removably receivable by a first receptacle 62 of the power device 20.

According to one or more embodiments, the system control device 24 is configured to receive the video from the modular wireless transmitter 30, and initiate at least one action based on the video.

According to one or more embodiments, the system control device 24 has a wireless communication range that reaches the power device 20 and does not reach the power device 20.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A premises monitoring system for monitoring a premises, comprising:
    a premises device; and
    a power device comprising a rectifier that is in electrical communication with the premises device and configured to transfer at least electrical power to the premises device via at least one wired connection, the power device comprising:
        a first receptacle configured to, in response to a modular wireless transmitter being removably received by the first receptacle, transfer power to the modular wireless transmitter and transfer data to the modular wireless transmitter for wireless transmission;
    the premises device comprising:
        a video capture element configured to capture video;
        a second receptacle configured to, in response to the modular wireless transmitter being removably received by the second receptacle, transfer power to the modular wireless transmitter and transfer data to the modular wireless transmitter for wireless transmission;
        processing circuitry configured to:
            determine whether the modular wireless transmitter is removably received by the second receptacle of the premises device;
            in response to determining the modular wireless transmitter is removably received by the second receptacle, cause wireless transmission of the captured video to a system control device via the modular wireless transmitter; and
            in response to determining the modular wireless transmitter is not removably received by the second receptacle of the premises device, cause transmission of the captured video to the power device via the at least one wired connection; and
    when the modular wireless transmitter is removably received by the first receptacle, the power device is configured to cause, in response to receiving the captured video, transmission of the captured video via the modular wireless transmitter.

2. The premises monitoring system of claim 1, further comprising a system control device having a wireless communication range that reaches the power device and does not reach the premises device, the system control device being configured to receive the captured video from the modular wireless transmitter and initiate at least one action based on the captured video.

3. A premises monitoring system for monitoring a premises, comprising:
    a premises device; and
    a power device comprising:
        a rectifier that is in electrical communication with the premises device and configured to transfer at least electrical power to the premises device via at least one wired connection; and
        a first receptacle that is configured to, in response to a modular wireless transmitter being removably received by the first receptacle, transfer power to the modular wireless transmitter and transfer data to the modular wireless transmitter for wireless transmission;
    the premises device comprising:
        a video capture element configured to capture video;
        a second receptacle that is configured to, in response to the modular wireless transmitter being removably received by the second receptacle, transfer power to the modular wireless transmitter and transfer data to the modular wireless transmitter for wireless transmission; and
        processing circuitry configured to, in response to the modular wireless transmitter not being removably connected to the premises device, cause transmission of the captured video to the power device via the at least one wired connection; and
    when the modular wireless transmitter is removably connected to the power device, the power device is configured to cause, in response to receiving the captured video, transmission of the captured video via the modular wireless transmitter.

4. The premises monitoring system of claim 3, wherein the processing circuitry is further configured to, in response to the modular wireless transmitter being removably connected to the premises device, cause wireless transmission of the captured video using the modular wireless transmitter.

5. The premises monitoring system of claim 3, wherein the at least one wired connection comprises:
   at least one power cable that is configured to transfer the electrical power to the premises device; and
   at least one data cable that is configured to transfer data.

6. The premises monitoring system of claim 3, wherein the at least one wired connection comprises an Ethernet cable.

7. The premises monitoring system of claim 3, wherein the modular wireless transmitter is one of:
   removably attachable to the power device; or
   removably receivable by a first receptacle of the power device.

8. The premises monitoring system of claim 3, further comprising a system control device configured to:
   receive the video from the modular wireless transmitter; and
   initiate at least one action based on the video.

9. The premises monitoring system of claim 8, wherein the system control device has a wireless communication range that reaches the power device and does not reach the premises device.

10. A method implemented by a premises monitoring system for monitoring a premises, the premises monitoring system comprising a premises device and a power device, the power device comprising a rectifier in electrical communication with the premises device, the power device being configured to transfer at least electrical power to the premises device via at least one wired connection, the method comprising:
    in response to a modular wireless transmitter being removably received by a first receptacle of the power device, transferring power to the modular wireless transmitter and transferring data to the modular wireless transmitter for wireless transmission;
    capturing video via a video capture element of the premise device;
    in response to the modular wireless transmitter being removably received by a second receptacle of the premises device, transferring power to the modular wireless transmitter and transferring data to the modular wireless transmitter for wireless transmission;
    in response to the modular wireless transmitter not being removably connected to the premises device, causing, at the premises device, transmission of the captured video to the power device via the at least one wired connection; and
    when the modular wireless transmitter is removably connected to the power device, causing, at the power device and in response to receiving the captured video, transmission of the captured video via the modular wireless transmitter.

11. The method of claim 10, further comprising, in response to the modular wireless transmitter being removably connected to the premises device, causing, at the premises device, wireless transmission of the captured video using the modular wireless transmitter.

12. The method of claim 10, wherein the at least one wired connection comprises:
    at least one power cable that is configured to transfer the electrical power to the premises device; and
    at least one data cable that is configured to transfer data.

13. The method of claim 10, wherein the at least one wired connection comprises an Ethernet cable.

14. The method of claim 10, wherein the modular wireless transmitter is one of:
    removably attachable to the power device; or
    removably receivable by a first receptacle of the power device.

15. The method of claim 10, further comprising:
    receiving, at a system control device, the video from the modular wireless transmitter; and
    initiate, at the system control device, at least one action based on the video.

16. The method of claim 15, wherein the system control device has a wireless communication range that reaches the power device and does not reach the premises device.

* * * * *